United States Patent
Sun et al.

(10) Patent No.: US 11,558,254 B1
(45) Date of Patent: Jan. 17, 2023

(54) CONFIGURATION HASH COMPARISON

(71) Applicant: KONG INC., San Francisco, CA (US)

(72) Inventors: Datong Sun, San Francisco, CA (US);
Aapo Talvensaari, Vantaa (FI);
Wangchong Zhou, Shanghai (CN);
Michael Fero, Oviedo, FL (US);
Guilherme Salazar, Goiânia (BR);
Enrique García Cota, Madrid (ES);
Alan Boudreault, Québec (CA)

(73) Assignee: KONG INC., San Francisco, CA (US)

( * ) Notice: Subject to any disclaimer, the term of this patent is extended or adjusted under 35 U.S.C. 154(b) by 0 days.

(21) Appl. No.: 17/808,413

(22) Filed: Jun. 23, 2022

(51) Int. Cl.
*G06F 15/173* (2006.01)
*H04L 41/0866* (2022.01)
*H04L 41/0803* (2022.01)

(52) U.S. Cl.
CPC ...... *H04L 41/0866* (2013.01); *H04L 41/0803* (2013.01)

(58) Field of Classification Search
CPC .......................... H04L 41/0866; H04L 41/0803
See application file for complete search history.

(56) References Cited

U.S. PATENT DOCUMENTS

| | | | | |
|---|---|---|---|---|
| 11,023,528 B1* | 6/2021 | Lee | ...................... | H04L 65/762 |
| 11,032,160 B1* | 6/2021 | Raheja | ................ | H04L 41/0843 |
| 11,037,168 B1* | 6/2021 | Lee | .......................... | G06F 9/54 |
| 11,171,842 B2* | 11/2021 | Palladino | ................ | H04L 67/56 |
| 11,416,942 B1* | 8/2022 | Leise | .................... | H04L 9/0637 |
| 2020/0348921 A1* | 11/2020 | Marechal | ................ | G06F 8/65 |
| 2021/0075700 A1* | 3/2021 | Palladino | ................ | H04L 47/74 |
| 2021/0406071 A1* | 12/2021 | Groenewald | ............. | G06F 8/31 |
| 2022/0038554 A1* | 2/2022 | Merwaday | ............. | H04L 67/63 |
| 2022/0058042 A1* | 2/2022 | Vanjare | ............... | H04L 41/0895 |
| 2022/0060431 A1* | 2/2022 | Vadayadiyil Raveendran | ........... | H04L 41/12 |
| 2022/0103437 A1* | 3/2022 | Palladino | ................ | H04L 67/56 |
| 2022/0116445 A1* | 4/2022 | Filippou | ............... | H04L 67/568 |
| 2022/0166666 A1* | 5/2022 | Jain | ..................... | H04L 41/0806 |

FOREIGN PATENT DOCUMENTS

| | | | | |
|---|---|---|---|---|
| CN | 114237693 A | * | 3/2022 | |
| WO | WO-2021127412 A1 | * | 6/2021 | .......... G06F 11/0745 |
| WO | WO-2022005685 A1 | * | 1/2022 | .......... G06F 9/44526 |
| WO | WO-2022081832 A2 | * | 4/2022 | |
| WO | WO-2022128068 A1 | * | 6/2022 | |

* cited by examiner

*Primary Examiner* — Richard G Keehn
(74) *Attorney, Agent, or Firm* — Perkins Coie LLP; Bailey Meyer; Colin Fowler

(57) ABSTRACT

Disclosed embodiments are directed at systems, methods, and architecture for operating a control plane of a microservice architecture application. The control plane may links a plurality of APIs for the microservice architecture application. The communication between the APIs and the control plane enables the control plane to assess the settings of the APIs compared to stored versions of the settings. The settings and stored versions may each be hashed with a hashing algorithm. The control plane may instruct APIS to update their settings responsive to determining that the settings do not match the stored versions.

20 Claims, 14 Drawing Sheets

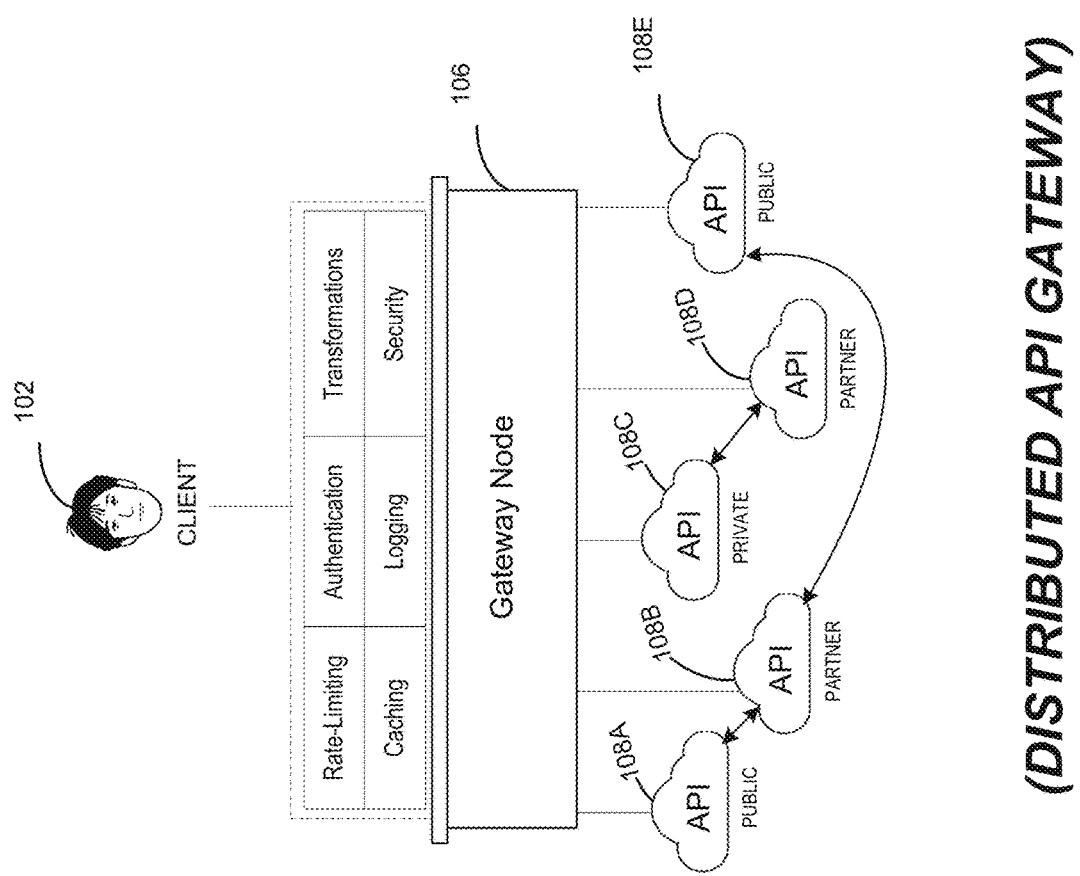
FIG. 1B (DISTRIBUTED API GATEWAY)

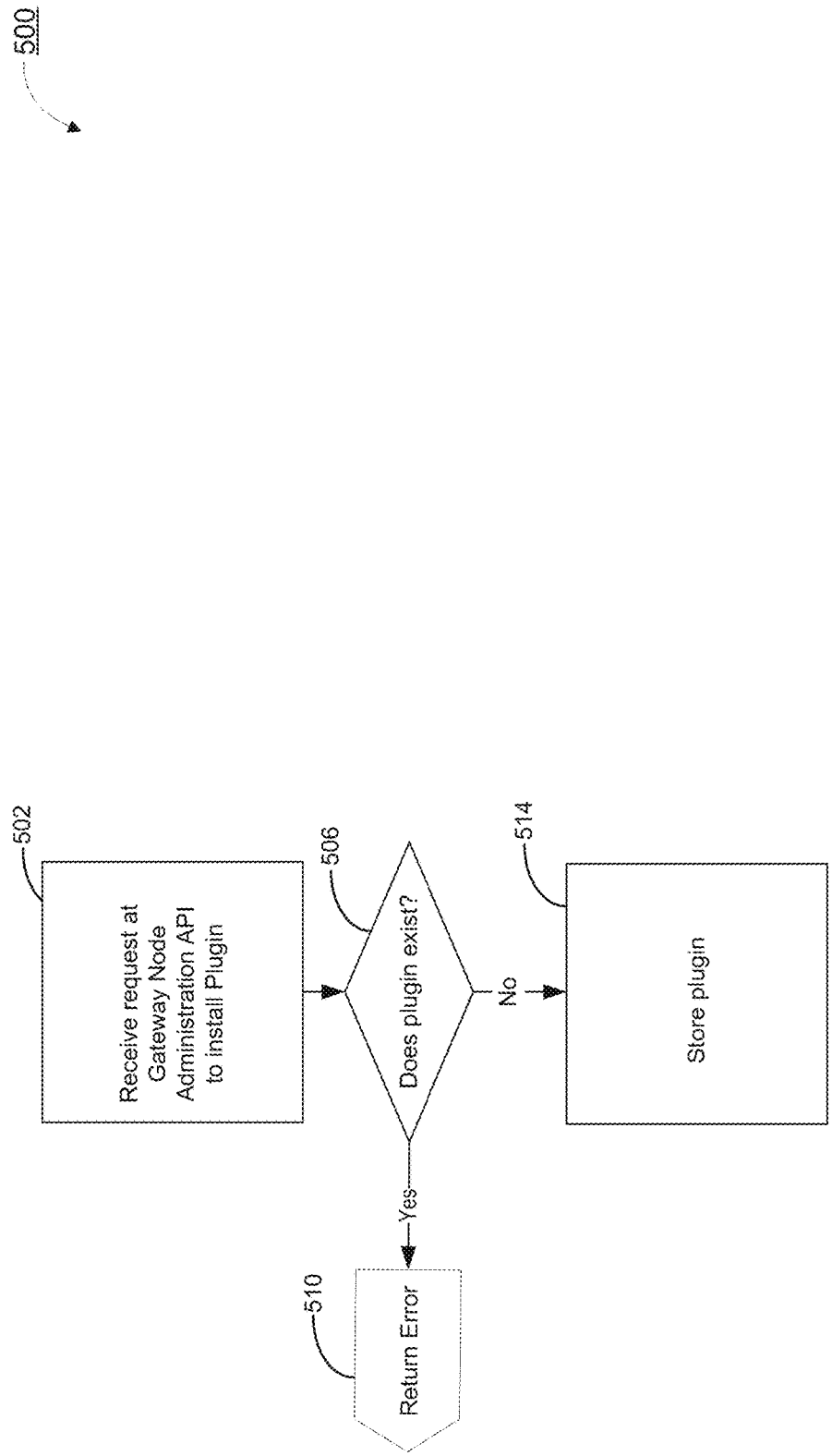

US 11,558,254 B1

CONFIGURATION HASH COMPARISON

TECHNICAL FIELD

The disclosure relates to distributed microservice architecture networks and more particularly to comparing stored and actual settings of microservices.

BACKGROUND

Microservices are a software development technique-a variant of the service-oriented architecture (SOA) architectural style that structures an application as a collection of loosely coupled services (embodied in application program interfaces). In a microservices architecture, services are fine-grained and the protocols are lightweight. The benefit of decomposing an application into different smaller services is that it improves modularity. This makes the application easier to understand, develop, test, and become more resilient to architecture erosion. Microservices parallelize development by enabling small autonomous teams to develop, deploy and scale their respective services independently. Microservice-based architectures enable continuous delivery and deployment.

A system may monitor a plurality of microservices to ensure proper processing of data for applications running via the microservices. However, in some instances, the system may detect that a microservice is not outputting the expected data for a process being run at the microservice. If the system is unable to access the settings of the microservice, the system may be unable to determine the cause of the unexpected data and perform corrections for the process. Thus, the system needs a secure way of analyzing the settings of microservices to ensure optimal data processing for applications.

BRIEF DESCRIPTION OF THE DRAWINGS

FIG. 1B illustrates a distributed API gateway architecture, according to an embodiment of the disclosed technology.

FIG. 5 illustrates a flow diagram showing steps involved in the installation of a plugin at a gateway node, according to an embodiment of the disclosed technology.

DETAILED DESCRIPTION

Figure 1A:
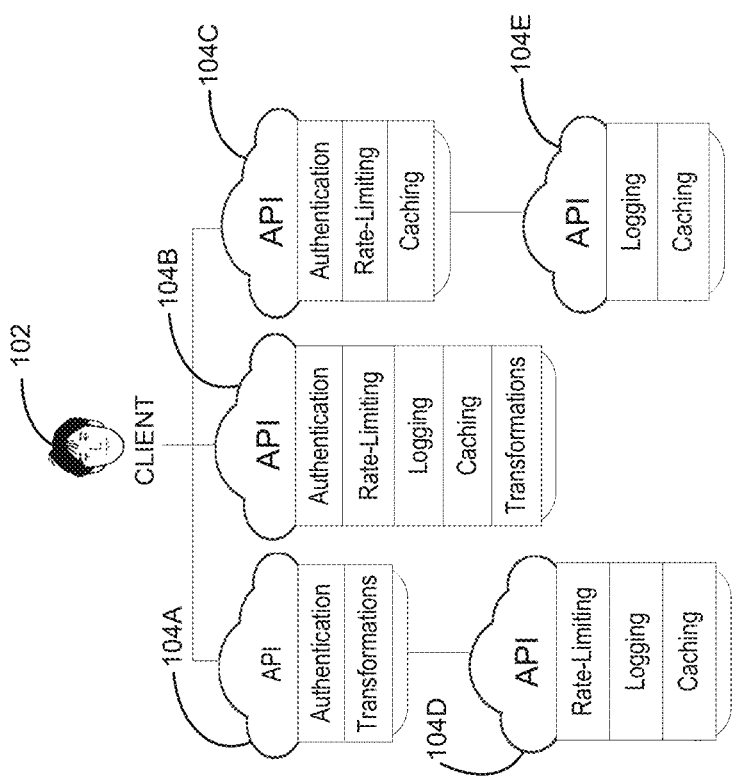
FIG. 1A illustrates a prior art approach with multiple APIs having functionalities common to one another.

The disclosed technology describes how a control plane monitors microservices in a microservice application architecture. In network routing, the control plane is the part of the router architecture that is concerned with drawing the network topology, or the routing table that defines what to do with incoming packets. Control plane logic also can define certain packets to be discarded, as well as preferential treatment of certain packets for which a high quality of service is defined by such mechanisms as differentiated services.

In monolithic application architecture, a control plane operates outside the core application. In a microservices architecture, the control plane operates between each application programming interface (API) that makes up the microservice architecture. Proxies operate linked to each API. The proxy attached to each API is referred to as a "data plane proxy." Examples of a data plane proxy include the sidecar proxies of Envoy proxies. The control plane monitors the operations of the APIs (e.g., microservices) based on output data received from the APIs and communicates settings and input data with the APIs to run one or more microservice architecture applications.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure are directed at systems, methods, and architecture for management of microservices that together comprise one or more applications. The architecture is a distributed plurality of microservices that each perform processes for the applications. The plurality of microservices are connected at a control plane that monitors the output data from the microservices for running the applications. The control plane may request settings from the microservices to compare to the control plane's stored understanding of the microservices' settings. The control plane uses this comparison to determine whether settings of the microservices need to be altered for performing the processes.

FIG. 1A illustrates a prior art approach with multiple APIs having functionalities common to one another. As shown in FIG. 1A, a client 102 is associated with APIs 104A, 104B, 104C, 104D, and 104E. Each API has a standard set of features or functionalities associated with it. For example, the standard set of functionalities associated with API 104A are "authentication" and "transformations." The standard set of functionalities associated with API 104B are "authentication," "rate-limiting," "logging," "caching," and "transformations." Thus, "authentication" and "transformations" are functionalities that are common to APIs 104A and 104B. Similarly, several other APIs in FIG. 1A share common functionalities. However, it is noted that having each API handle its own functionalities individually causes duplication of efforts and code associated with these functionalities, which is inefficient. This problem becomes significantly more challenging when there are tens of thousands of APIs and millions of clients requesting API-related services per day.

FIG. 1B illustrates a distributed API gateway architecture according to an embodiment of the disclosed technology. To address the challenge described in connection with FIG. 1A, the disclosed technology provides a distributed API gateway architecture as shown in FIG. 1B. Specifically, disclosed embodiments implement common API functionalities by bundling the common API functionalities into a gateway node 106 (also referred to herein as an API Gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. There can be other functionalities included in the core set of functionalities besides those discussed in FIG. 1B. In some applications, gateway node 106 can help launch large-scale deployments in a very short time at reduced complexity and is therefore an inexpensive replacement for expensive proprietary API management systems. The disclosed technology includes a distributed architecture of gateway nodes with each gateway node bundled with a set of functionalities that can be extended depending on the use-case or applications.

Figure 2:
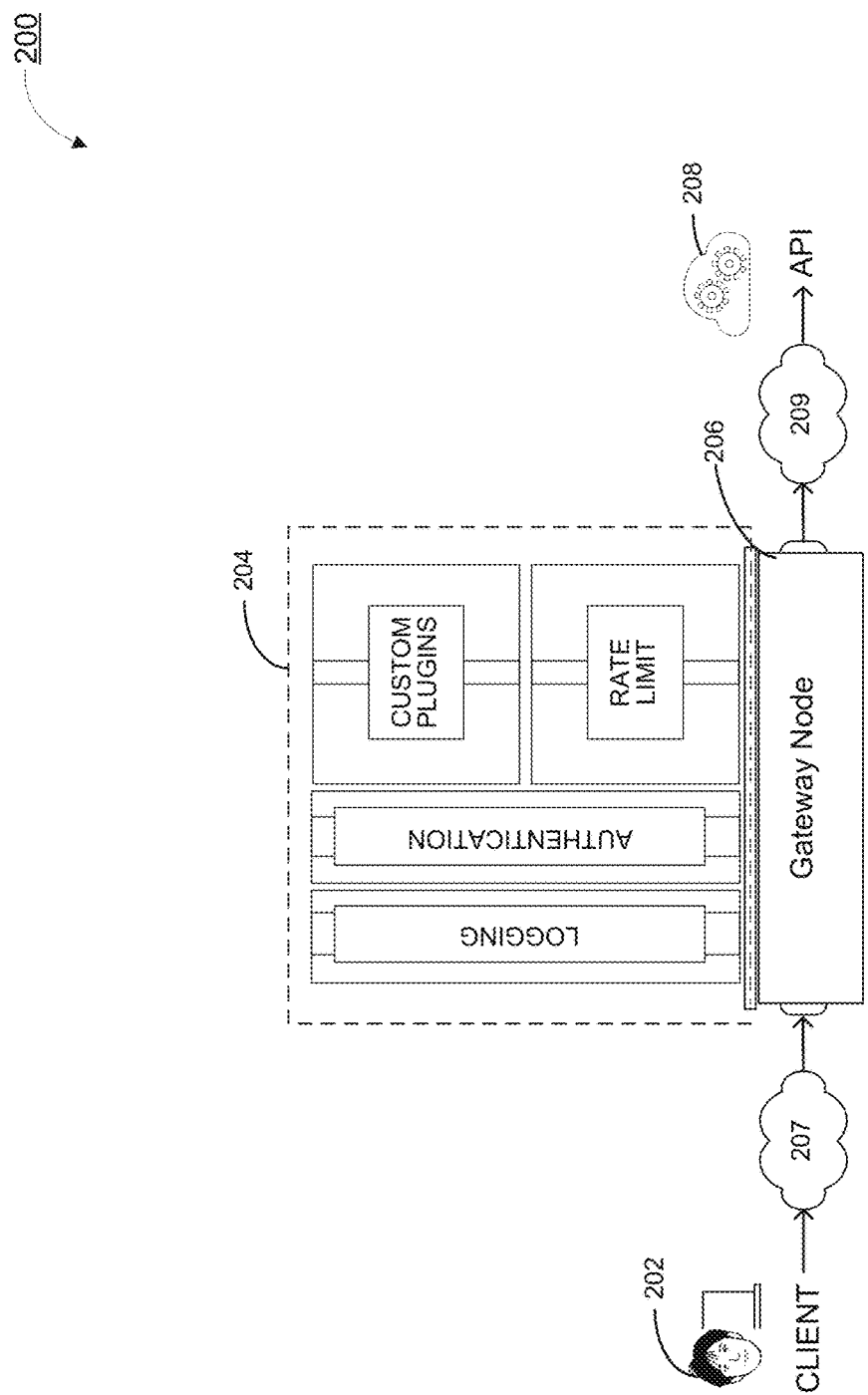
FIG. 2 illustrates a block diagram of an example environment suitable for functionalities provided by a gateway node, according to an embodiment of the disclosed technology.

FIG. 2 illustrates a block diagram of an example environment suitable for functionalities provided by a gateway node according to an embodiment of the disclosed technology. In some embodiments, a core set of functionalities are provided in the form of "plugins" or "add-ons" installed at a gateway node. (Generally, a plugin is a component that allows modification of what a system can do usually without forcing a redesign/compile of the system. When an application supports plug-ins, it enables customization. The common examples are the plug-ins used in web browsers to add new features such as search-engines, virus scanners, or the ability to utilize a new file type such as a new video format.)

As an example, a set of plugins 204 shown in FIG. 2 are provided by gateway node 206 positioned between a client 202 and one or more HTTP APIs. Electronic devices operated by client 202 can include, but are not limited to, a server desktop, a desktop computer, a computer cluster, a mobile computing device such as a notebook, a laptop computer, a handheld computer, a mobile phone, a smart phone, a PDA, and/or an iPhone or Droid device, etc. Gateway node 206 and client 202 are configured to communicate with each other via network 207. Gateway node 206 and one or more APIs 208 are configured to communicate with each other via network 209. In some embodiments, the one or more APIs reside in one or more API servers, API data stores, or one or more API hubs. Various combinations of configurations are possible.

Networks 207 and 209 can be any collection of distinct networks operating wholly or partially in conjunction to provide connectivity to/from client 202 and one or more APIs 208. In one embodiment, network communications can be achieved by, an open network, such as the Internet, or a private network, such as an intranet and/or the extranet. Networks 207 and 209 can be a telephonic network, an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

Client 202 and one or more APIs 208 can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

The set of plugins 204 include authentication, logging, rate-limiting, and custom plugins, of which authentication, logging, traffic control, rate-limiting can be considered as the core set of functionalities. An authentication functionality can allow an authentication plugin to check for valid login credentials such as usernames and passwords. A logging functionality of a logging plugin logs data associated with requests and responses. A traffic control functionality of a traffic control plugin manages, throttles, and restricts inbound and outbound API traffic. A rate limiting functionality can allow managing, throttling, and restricting inbound and outbound API traffic. For example, a rate limiting plugin can determine how many HTTP requests a developer can make in a given period of seconds, minutes, hours, days, months or years.

A plugin can be regarded as a piece of stand-alone code. After a plugin is installed at a gateway node, it is available to be used. For example, gateway node 206 can execute a plugin in between an API-related request and providing an associated response to the API-related request. One advantage of the disclosed system is that the system can be expanded by adding new plugins. In some embodiments, gateway node 206 can expand the core set of functionalities by providing custom plugins. Custom plugins can be provided by the entity that operates the cluster of gateway nodes. In some instances, custom plugins are developed (e.g., built from "scratch") by developers or any user of the disclosed system. It can be appreciated that plugins, used in accordance with the disclosed technology, facilitate in centralizing one or more common functionalities that would be otherwise distributed across the APIs, making it harder to build, scale and maintain the APIs.

Other examples of plugins can be a security plugin, a monitoring and analytics plugin, and a transformation plugin. A security functionality can be associated with the system restricting access to an API by whitelisting or blacklisting/whitelisting one or more consumers identified, for example, in one or more Access Control Lists (ACLs). In some embodiments, the security plugin requires an authentication plugin to be enabled on an API. In some use cases, a request sent by a client can be transformed or altered before being sent to an API. A transformation plugin can apply a transformations functionality to alter the request sent by a client. In many use cases, a client might wish to monitor request and response data. A monitoring and analytics plugin can allow monitoring, visualizing, and inspecting APIs and microservices traffic.

In some embodiments, a plugin is Lua code that is executed during the life-cycle of a proxied request and response. Through plugins, functionalities of a gateway node can be extended to fit any custom need or integration challenge. For example, if a consumer of the disclosed system needs to integrate their API's user authentication with a third-party enterprise security system, it can be implemented in the form of a dedicated (custom) plugin that is run on every request targeting that given API. One advantage, among others, of the disclosed system is that the distributed cluster of gateway nodes is scalable by simply adding more nodes, implying that the system can handle virtually any load while keeping latency low.

One advantage of the disclosed system is that it is platform agnostic, which implies that the system can run anywhere. In one implementation, the distributed cluster can be deployed in multiple data centers of an organization. In some implementations, the distributed cluster can be deployed as multiple nodes in a cloud environment. In some implementations, the distributed cluster can be deployed as a hybrid setup involving physical and cloud computers. In some other implementations, the distributed cluster can be deployed as containers.

Figure 3A:
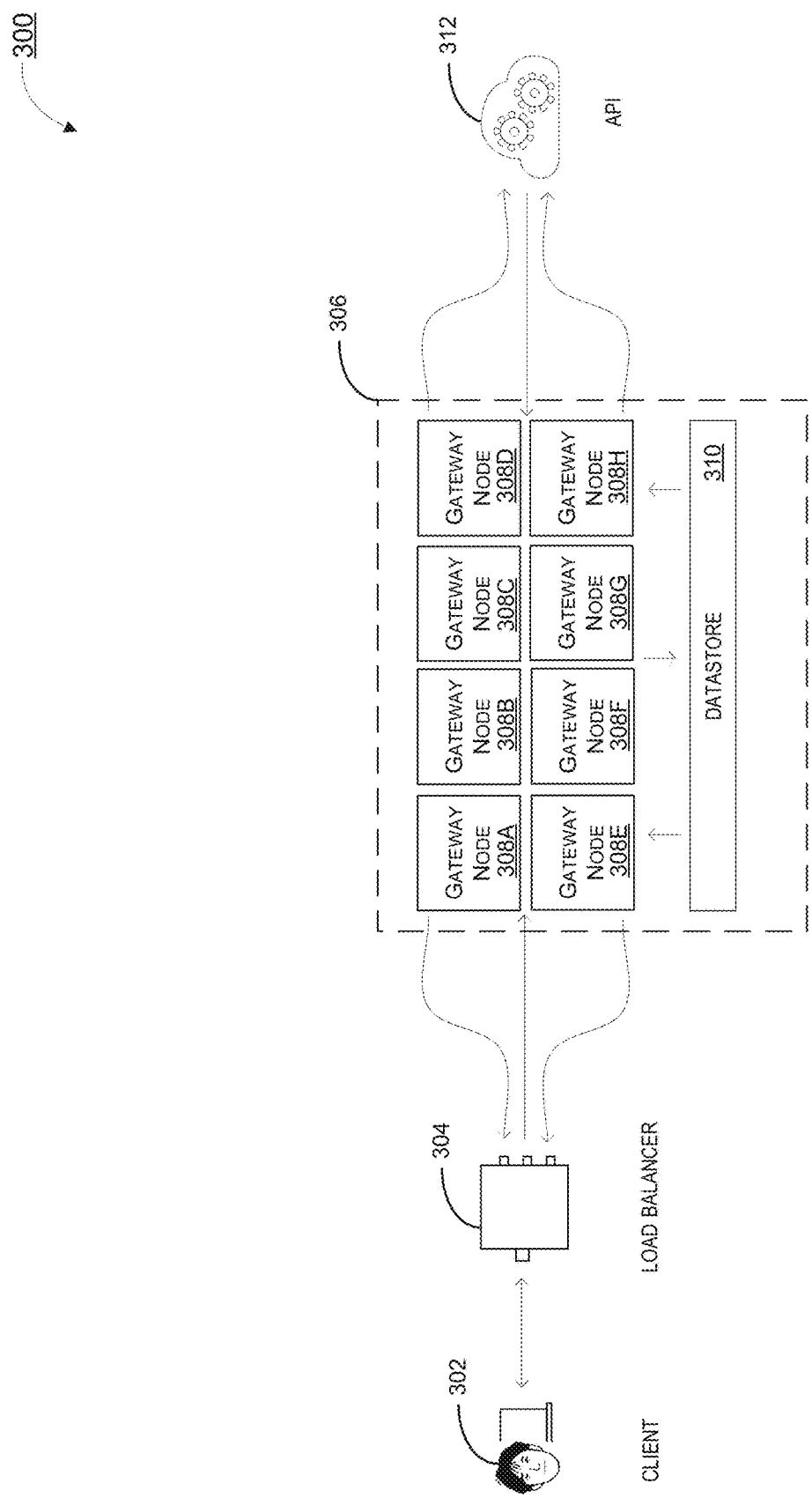
FIG. 3A illustrates a block diagram of an example environment with a cluster of gateway nodes in operation, according to an embodiment of the disclosed technology.

FIG. 3A illustrates a block diagram of an example environment with a cluster of gateway nodes in operation. In some embodiments, a gateway node is built on top of NGINX. NGINX is a high-performance, highly-scalable, highly-available web server, reverse proxy server, and web accelerator (combining the features of an HTTP load balancer, content cache, and other features). In an example deployment, a client 302 communicates with one or more APIs 312 via load balancer 304, and a cluster of gateway nodes 306. The cluster of gateway nodes 306 can be a distributed cluster. The cluster of gateway nodes 306 includes gateway nodes 308A-308H and data store 310. The functions represented by the gateway nodes 308A-308H and/or the data store 310 can be implemented individually or in any combination thereof, partially or wholly, in hardware, software, or a combination of hardware and software.

Load balancer 304 provides functionalities for load balancing requests to multiple backend services. In some embodiments, load balancer 304 can be an external load balancer. In some embodiments, the load balancer 304 can be a DNS-based load balancer. In some embodiments, the load balancer 304 can be a Kubernetes® load balancer integrated within the cluster of gateway nodes 306.

Data store 310 stores all the data, routing information, plugin configurations, etc. Examples of a data store can be Apache Cassandra or PostgreSQL. In accordance with disclosed embodiments, multiple gateway nodes in the cluster share the same data store, e.g., as shown in FIG. 3A. Because multiple gateway nodes in the cluster share the same data store, there is no requirement to associate a specific gateway node with the data store—data from each gateway node 308A-308H is stored in data store 310 and retrieved by the other nodes (e.g., even in complex multiple data center setups). In some embodiments, the data store shares configurations and software codes associated with a plugin that is installed at a gateway node. In some embodiments, the plugin configuration and code can be loaded at runtime.

Figure 3B:
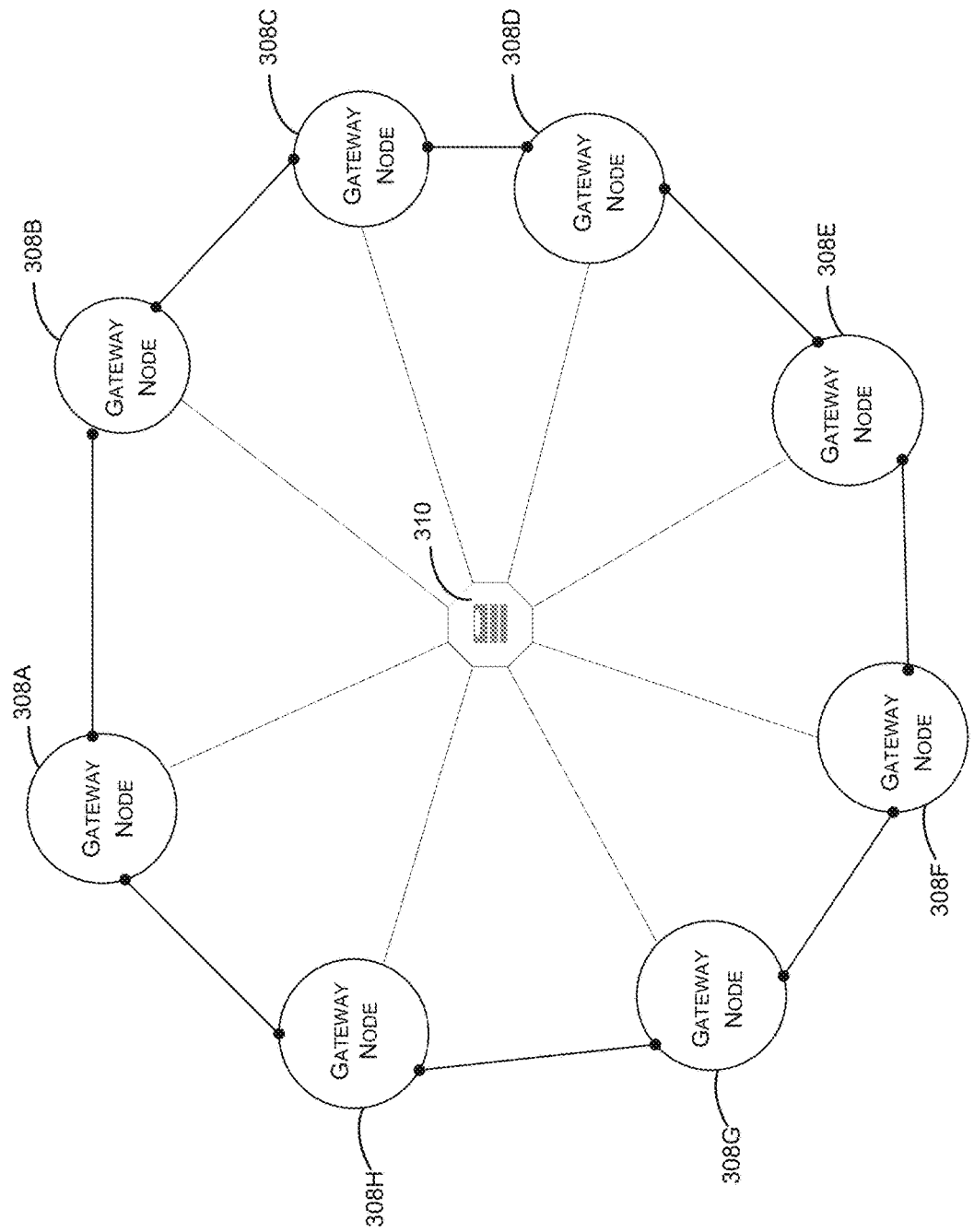
FIG. 3B illustrates a schematic of a data store shared by multiple gateway nodes, according to an embodiment of the disclosed technology.

FIG. 3B illustrates a schematic of a data store shared by multiple gateway nodes, according to an embodiment of the disclosed technology. For example, FIG. 3B shows data store 310 shared by gateway nodes 308A-308H arranged as part of a cluster.

One advantage of the disclosed architecture is that the cluster of gateway nodes allow the system to be scaled horizontally by adding more gateway nodes to encompass a bigger load of incoming API-related requests. Each of the gateway nodes share the same data since they point to the same data store. The cluster of gateway nodes can be created in one datacenter, or in multiple datacenters distributed across different geographical locations, in both cloud or on-premise environments. In some embodiments, gateway nodes (e.g., arranged according to a flat network topology) between the datacenters communicate over a Virtual Private Network (VPN) connection. The system can automatically handle a new gateway node joining a cluster or leaving a cluster. Once a gateway node communicates with another gateway node, it will automatically discover all the other gateway nodes due to an underlying gossip protocol.

In some embodiments, each gateway includes an administration API (e.g., internal RESTful API) for administration purposes. Requests to the administration API can be sent to any node in the cluster. The administration API can be a generic HTTP API. Upon set up, each gateway node is associated with a consumer port and an admin port that manages the API-related requests coming into the consumer port. For example, port number 8001 is the default port on which the administration API listens and 8444 is the default port for HTTPS (e.g., admin_listen_ssl) traffic to the administration API.

In some instances, the administration API can be used to provision plugins. After a plugin is installed at a gateway node, it is available to be used, e.g., by the administration API or a declarative configuration.

In some embodiments, the administration API identifies a status of a cluster based on a health state of each gateway node. For example, a gateway node can be in one of the following states:
- active: the node is active and part of the cluster.
- failed: the node is not reachable by the cluster.
- leaving: a node is in the process of leaving the cluster.
- left: the node has left the cluster.

In some embodiments, the administration API is an HTTP API available on each gateway node that allows the user to create, restore, update, and delete (CRUD) operations on items (e.g., plugins) stored in the data store. For example, the Admin API can provision APIs on a gateway node, provision plugin configuration, create consumers, and provision their credentials. In some embodiments, the administration API can also read, update, or delete the data. Generally, the administration API can configure a gateway node and the data associated with the gateway node in the data store.

In some applications, it is possible that the data store only stores the configuration of a plugin and not the software code of the plugin. That is, for installing a plugin at a gateway node, the software code of the plugin is stored on that gateway node. This can result in efficiencies because the user needs to update his or her deployment scripts to include the new instructions that would install the plugin at every gateway node. The disclosed technology addresses this issue by storing both the plugin and the configuration of the plugin. By leveraging the administration API, each gateway node can not only configure the plugins, but also install them. Thus, one advantage of the disclosed system is that a user does not have to install plugins at every gateway node. But rather, the administration API associated with one of the gateway nodes automates the task of installing the plugins at gateway nodes by installing the plugin in the shared data store, such that every gateway node can retrieve the plugin code and execute the code for installing the plugins. Because the plugin code is also saved in the shared data store, the code is effectively shared across the gateway nodes by leveraging the data store, and does not have to be individually installed on every gateway node.

Figure 4A:
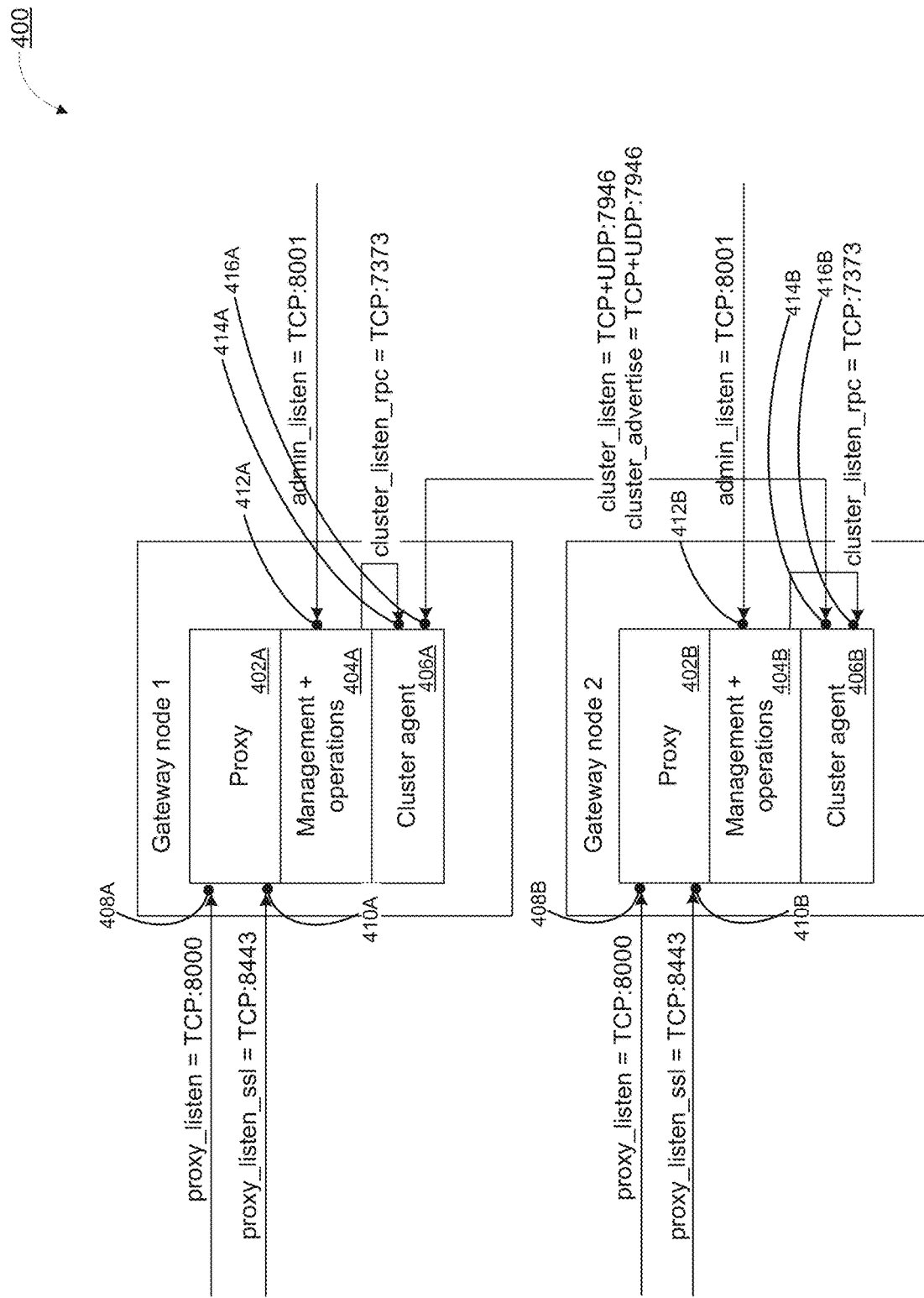
FIG. 4A and FIG. 4B illustrate example ports and connections of a gateway node, according to an embodiment of the disclosed technology.
Figure 4B:
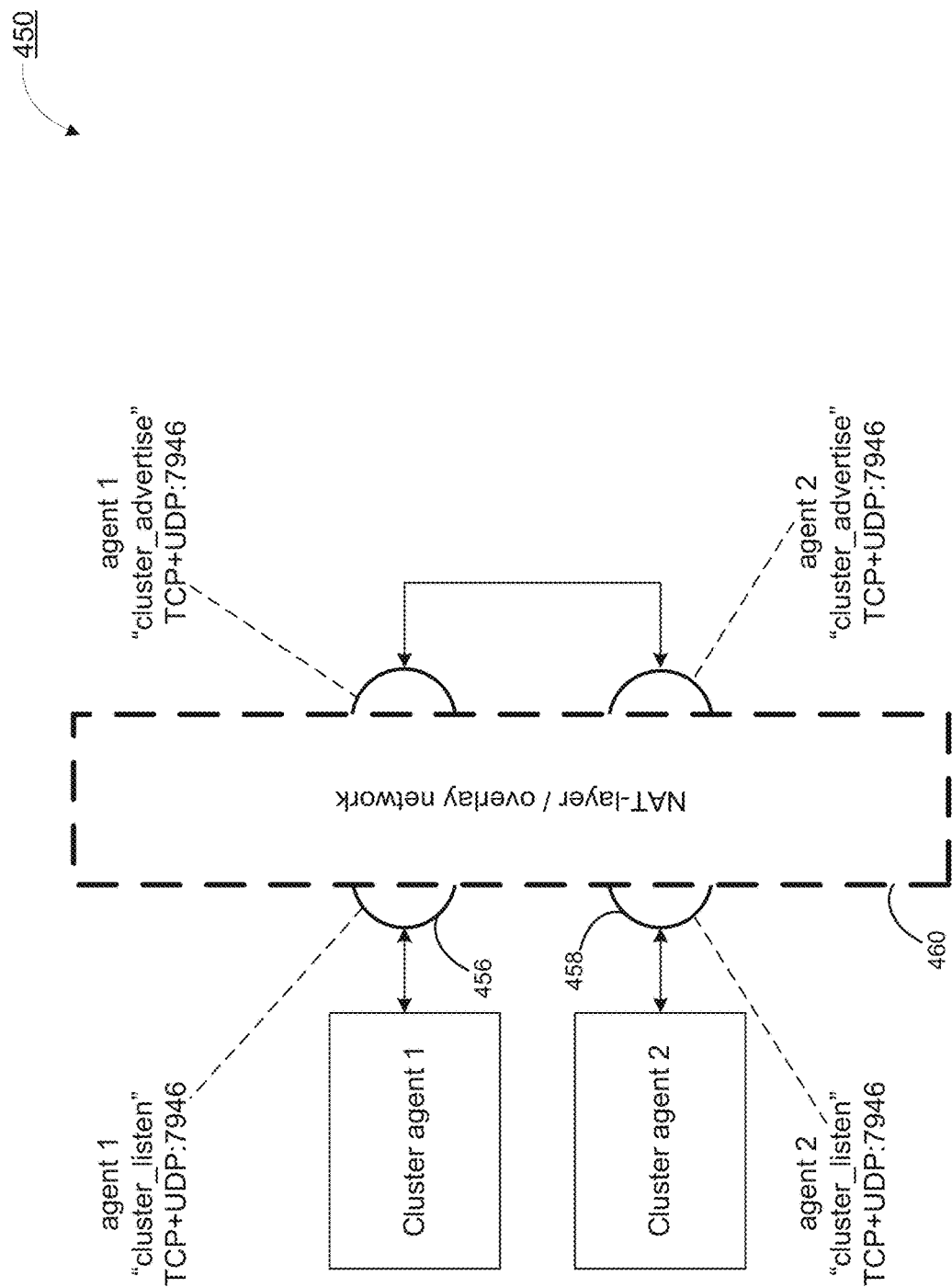

FIG. 4A and FIG. 4B illustrate example block diagrams 400 and 450 showing ports and connections of a gateway node, according to an embodiment of the disclosed technology. Specifically, FIG. 4A shows a gateway node 1 and gateway node 2. Gateway node 1 includes a proxy module 402A, a management and operations module 404A, and a cluster agent module 406A. Gateway node 2 includes a proxy module 402B, a management and operations module 404B, and a cluster agent module 406B. Gateway node 1 receive incoming traffic at ports denoted as 408A and 410A. Ports 408A and 410A are coupled to proxy module 402B. Gateway node 1 listens for HTTP traffic at port 408A. The default port number for port 408A is 8000. API-related requests are typically received at port 408A. Port 410A is used for proxying HTTPS traffic. The default port number for port 410A is 8443. Gateway node 1 exposes its administration API (alternatively, referred to as management API) at port 412A that is coupled to management and operations module 404A. The default port number for port 412A is 8001. The administration API allows configuration and management of a gateway node, and is typically kept private and secured. Gateway node 1 allows communication within itself (i.e., intra-node communication) via port 414A that is coupled to clustering agent module 406A. The default port number for port 414A is 7373. Because the traffic (e.g., TCP traffic) here is local to a gateway node, this traffic does not need to be exposed. Cluster agent module 406B of gateway node 1 enables communication between gateway node 1 and other gateway nodes in the cluster. For example, ports 416A and 416B coupled with cluster agent module 406A at gateway node 1 and cluster agent module 406B at gateway node 2 allow intra-cluster or inter-node communication. Intra-cluster communication can involve UDP and TCP traffic. Both ports 416A and 416B have the default port number set to 7946. In some embodiments, a gateway node automatically (e.g., without human intervention) detects its ports and addresses. In some embodiments, the ports and addresses are advertised (e.g., by setting the cluster_advertise property/setting to a port number) to other gateway nodes. It will be understood that the connections and ports (denoted with the numeral "B") of gateway node 2 are similar to those in gateway node 1, and hence is not discussed herein.

FIG. 4B shows cluster agent 1 coupled to port 456 and cluster agent 2 coupled to port 458. Cluster agent 1 and cluster agent 2 are associated with gateway node 1 and gateway node 2 respectively. Ports 456 and 458 are communicatively connected to one another via a NAT-layer 460. In accordance with disclosed embodiments, gateway nodes are communicatively connected to one another via a NAT-layer. In some embodiments, there is no separate cluster agent but the functionalities of the cluster agent are integrated into the gateway nodes. In some embodiments, gateway nodes communicate with each other using the explicit IP address of the nodes.

FIG. 5 illustrates a flow diagram showing steps of a process 500 involved in installation of a plugin at a gateway node, according to an embodiment of the disclosed technology. At step 502, the administration API of a gateway node receives a request to install a plugin. An example of a request is provided below:
For example:
POST/plugins/install
name=OPTIONAL VALUE
code=VALUE
archive=VALUE The administration API of the gateway node determines (at step 506) if the plugin exists in the data store. If the gateway node determines that the plugin exists in the data store, then the process returns (step 510) an error. If the gateway node determines that the plugin does not exist in the data store, then the process stores the plugin. (In some embodiments, the plugin can be stored in an external data store coupled to the gateway node, a local cache of the gateway node, or a third-party storage. For example, if the plugin is stored at some other location besides the data store, then different policies can be implemented for accessing the plugin.) Because the plugin is now stored in the database, it is ready to be used by any gateway node in the cluster.

When a new API request goes through a gateway node (in the form of network packets), the gateway node determines (among other things) which plugins are to be loaded. Therefore, a gateway node sends a request to the data store to retrieve the plugin(s) that has/have been configured on the API and that need(s) to be executed. The gateway node communicates with the data store using the appropriate database driver (e.g., Cassandra or PostgresSQL) over a TCP communication. In some embodiments, the gateway node retrieves both the plugin code to execute and the plugin configuration to apply for the API, and then execute them at runtime on the gateway node (e.g., as explained in FIG. 6).

Figure 6:
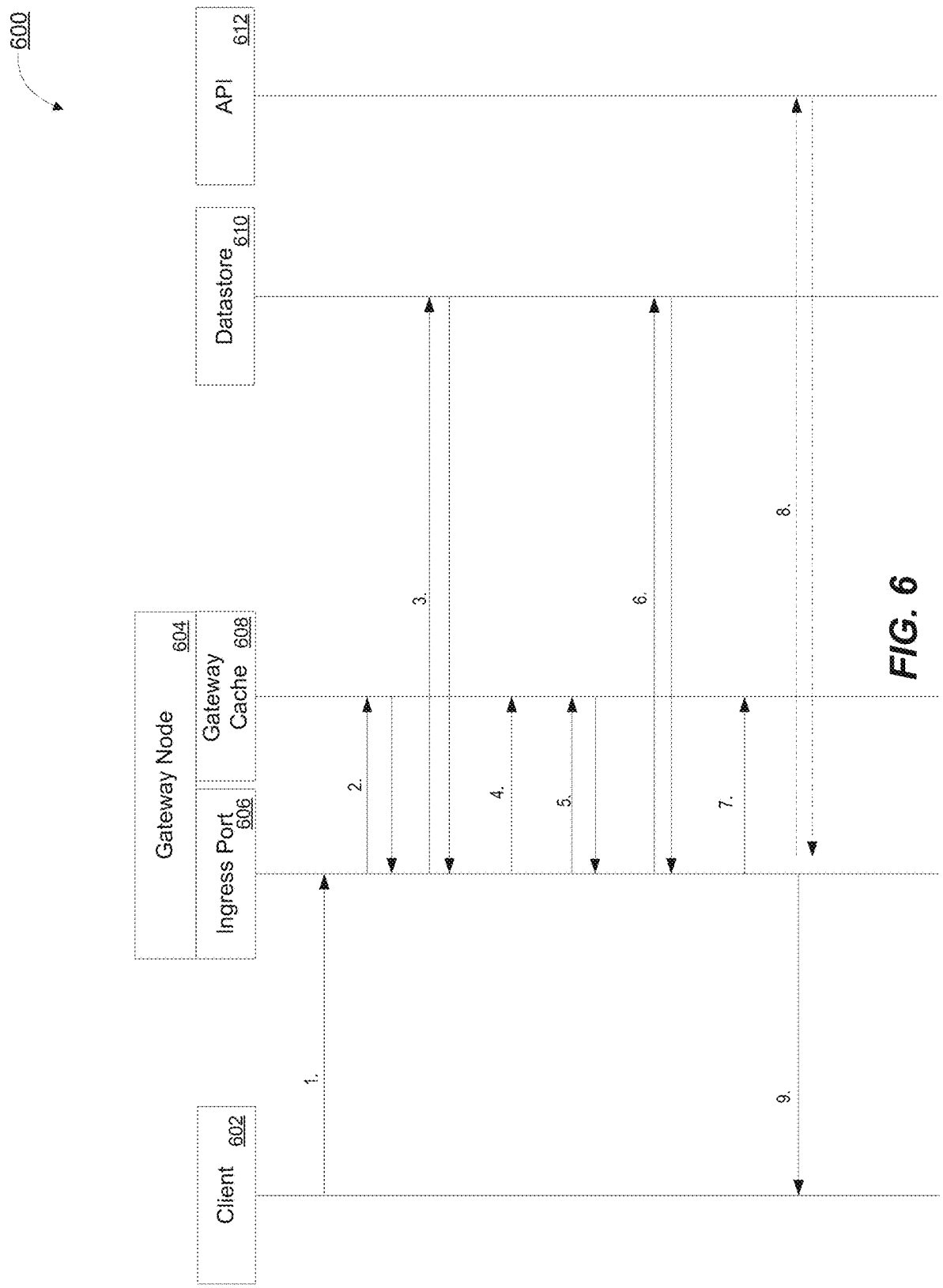
FIG. 6 illustrates a sequence diagram showing components and associated steps involved in loading configurations and code at runtime, according to an embodiment of the disclosed technology.

FIG. 6 illustrates a sequence diagram 600 showing components and associated steps involved in loading configurations and code at runtime, according to an embodiment of the disclosed technology. The components involved in the interaction are client 602, gateway node 604 (including an ingress port 606 and a gateway cache 608), data store 610, and an API 612. At step 1, a client makes a request to gateway node 604. At step 2, ingress port 606 of gateway node 604 checks with gateway cache 608 to determine if the plugin information and the information to process the request has already been cached previously in gateway cache 608. If the plugin information and the information to process the request is cached in gateway cache 608, then the gateway cache 608 provides such information to the ingress port 606. If, however, the gateway cache 608 informs the ingress port 606 that the plugin information and the information to process the request is not cached in gateway cache 608, then the ingress port 606 loads (at step 3) the plugin information and the information to process the request from data store 610. In some embodiments, ingress port 606 caches (for subsequent requests) the plugin information and the information to process the request (retrieved from data store 610) at gateway cache 608. At step 5, ingress port 606 of gateway node 604 executes the plugin and retrieves the plugin code from the cache, for each plugin configuration. However, if the plugin code is not cached at the gateway cache 608, the gateway node 604 retrieves (at step 6) the plugin code from data store 610 and caches (step 7) it at gateway cache 608. The gateway node 604 executes the plugins for the request and the response (e.g., by proxy the request to API 612 at step 7), and at step 8, the gateway node 604 returns a final response to the client.

Figure 7:
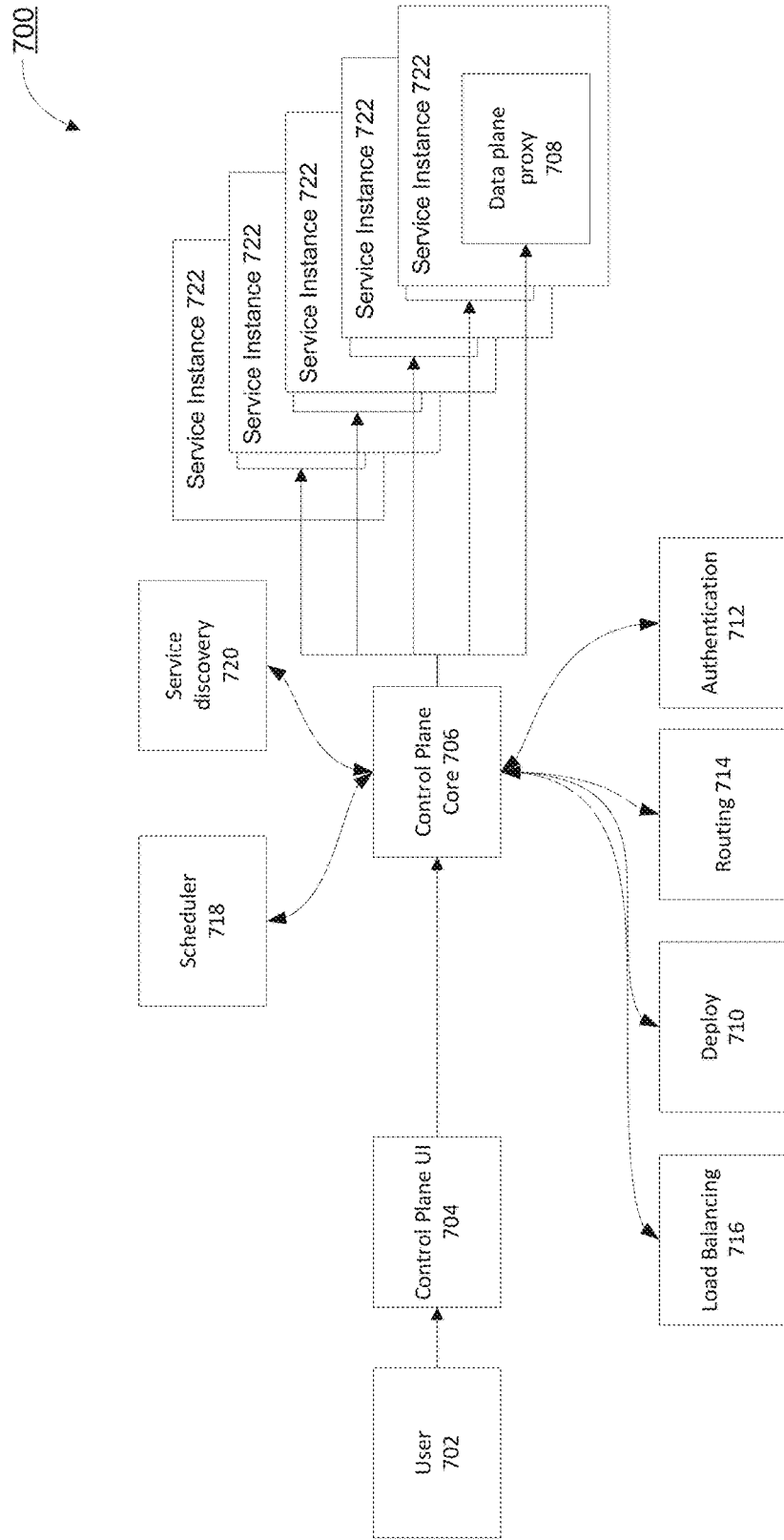
FIG. 7 is a block diagram of a control plane system for a service mesh in a microservices architecture

FIG. 7 is a block diagram of a control plane system 700 for a service mesh in a microservices architecture. A service mesh data plane is controlled by a control plane. In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

Service mesh data plane: Touches every packet/request in the system. Responsible for service discovery, health checking, routing, load balancing, authentication/authorization, and observability.

Service mesh control plane: Provides policy and configuration for all of the running data planes in the mesh. Does not touch any packets/requests in the system but collects the packets in the system. The control plane turns all the data planes into a distributed system.

A service mesh such as Linkerd, NGINX, HAProxy, Envoy co-locate service instances with a data plane proxy network proxy. Network traffic (HTTP, REST, gRPC, Redis, etc.) from an individual service instance flows via its local data plane proxy to the appropriate destination. Thus, the service instance is not aware of the network at large and only knows about its local proxy. In effect, the distributed system network has been abstracted away from the service programmer. In a service mesh, the data plane proxy performs a number of tasks. Example tasks include service discovery, health checking, routing, load balancing, authentication and authorization, and observability.

Service discovery identifies each of the upstream/backend microservice instances within used by the relevant application. Health checking refers to detection of whether upstream service instances returned by service discovery are ready to accept network traffic. The detection may include both active (e.g., out-of-band pings to an endpoint) and passive (e.g., using 3 consecutive 5xx as an indication of an unhealthy state) health checking. The service mesh is further configured to route requests from local service instances to desired upstream service clusters.

Load balancing: Once an upstream service cluster has been selected during routing, a service mesh is configured load balance. Load balancing includes determining which upstream service instance should the request be sent; with what timeout; with what circuit breaking settings; and if the request fails should it be retried?

The service mesh further authenticates and authorizes incoming requests cryptographically using mTLS or some other mechanism. Data plane proxies enable observability features including detailed statistics, logging, and distributed tracing data should be generated so that operators can understand distributed traffic flow and debug problems as they occur.

In effect, the data plane proxy is the data plane. Said another way, the data plane is responsible for conditionally translating, forwarding, and observing every network packet that flows to and from a service instance.

The network abstraction that the data plane proxy provides does not inherently include instructions or built in methods to control the associated service instances in any of the ways described above. The control features are the enabled by a control plane. The control plane takes a set of isolated stateless data plane proxies and turns them into a distributed system.

A service mesh and control plane system 700 includes a user 702 whom interfaces with a control plane UI 704. The UI 704 might be a web portal, a CLI, or some other interface. Through the UI 704, the user 702 has access to the control plane core 706. The control plane core 706 serves as a central point that other control plane services operate through in connection with the data plane proxies 708. Ultimately, the goal of a control plane is to set policy that will eventually be enacted by the data plane. More advanced control planes will abstract more of the system from the operator and require less handholding.

The control plane services may include global system configuration settings such as deploy control 710 (blue/green and/or traffic shifting), authentication and authorization settings 712, route table specification 714 (e.g., when service A requests a command, what happens), load balancer settings 716 (e.g., timeouts, retries, circuit breakers, etc.), a workload scheduler 718, and a service discovery system 720. The scheduler 718 is responsible for bootstrapping a service along with its data plane proxy 718. Services 722 are run on an infrastructure via some type of scheduling system (e.g., Kubernetes or Nomad). Typical control planes operate in control of control plane services 710-720 that in turn control the data plane proxies 708. Thus, in typical examples, the control plane services 710-720 are intermediaries to the services 722 and associated data plane proxies 708.

As depicted in FIG. 7, the control plane core 706 is the intermediary between the control plane services 710-720 and the data plane proxies 708. Acting as the intermediary, the control plane core 706 removes dependencies that exist in other control plane systems and enables the control plane core 706 to be platform agnostic. The control plane services 710-720 act as managed stores. With managed storages in a cloud deployment, scaling and maintaining the control plane core 706 involves fewer updates. The control plane core 706 can be split to multiple modules during implementation.

The control plane core 706 passively monitors each service instance 722 via the data plane proxies 708 via live traffic. However, the control plane core 706 may take active checks to determine the status or health of the overall application.

The control plane core 706 supports multiple control plane services 710-720 at the same time by defining which one is more important through priorities. Employing a control plane core 706 as disclosed aids control plane service 710-720 migration. Where a user wishes to change the control plane service provider (ex: changing service discovery between Zookeper based discovery to switch to Consul based discovery), a control plane core 706 that receives the output of the control plane services 710-720 from various providers can configure each regardless of provider. Conversely, a control plane that merely directs control plane services 710-720 includes no such configuration store.

Another feature provided by the control plane core 706 is Static service addition. For example, a user may run Consul, but you want to add another service/instance (ex: for debugging). The user may not want to add the additional service on the Consul cluster. Using a control plane core 706, the user may plug the file-based source with custom definition multi-datacenter support. The user may expose the state hold in control plane core 706 as HTTP endpoint, plug the control plane core 706 from other datacenters as a source with lower priority. This will provide fallback for instances in the other datacenters when instances from local datacenter are unavailable.

Service Group Discovery and Observation

Figure 8:
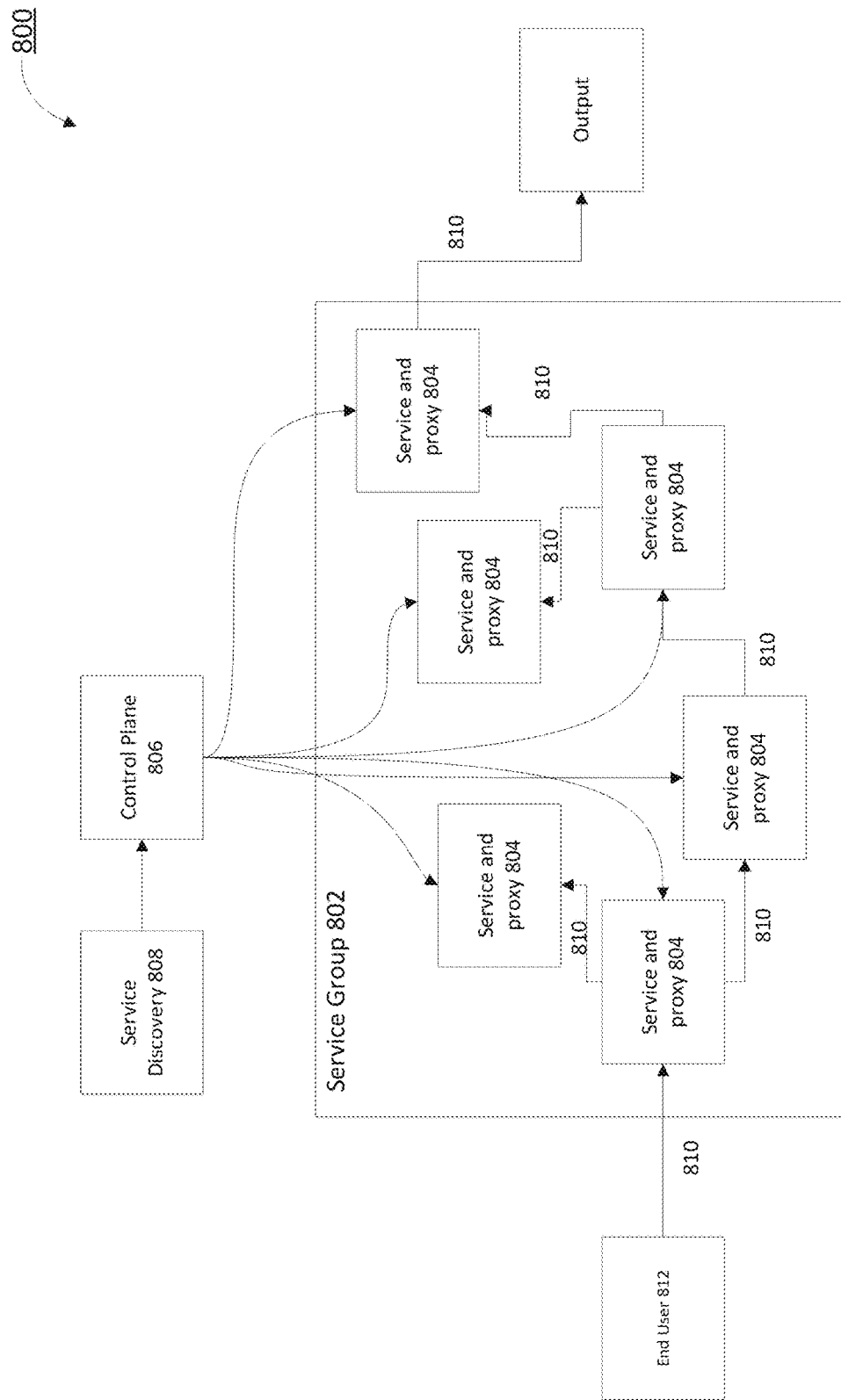
FIG. 8 is a block diagram illustrating service groups and features associated with identification thereof.

FIG. 8 is a block diagram illustrating service groups 802 and features associated with identification thereof. A service group 802 is a group of services 804 that together perform an identifiable application purpose or business flow. For example, a set of microservices are responsible for an airline's ticketing portion of their website. Other examples may include "customer experience," "sign up," "login," "payment processing", etc. Using a control plane 806 with an associated service discovery 808 feature, packets are be monitored as they filter through the overall application (ex: whole website).

Given a starting point of a given service group 802, the control plane 806 may run a trace on packets having a known ID and follow where those packets (with the known ID) go in the microservice architecture as tracked by data plane proxies. In that way, the system can then automatically populate a service group 802 using the trace. The trace is enabled via the shared execution path of the data plane proxies. Along each step 810 between services 804, the control plane 804 measures latency and discover services. The trace may operate on live traffic corresponding to end users 812, or alternatively using test traffic.

As output, the control plane generates a dependency graph of the given service group 802 business flow and reports via a GUI. Using the dependency graph, a backend operator is provided insight into bottlenecks in the service group 802. For example, in a given service group 802, a set of services 804 may run on multiple servers that are operated by different companies (e.g., AWS, Azure, Google Cloud, etc.). The latency between these servers may slow down the service group 802 as a whole. Greater observability into the service group 802 via a dependency graph enables backend operators to improve the capabilities and throughput of the service group 802.

Figure 9:
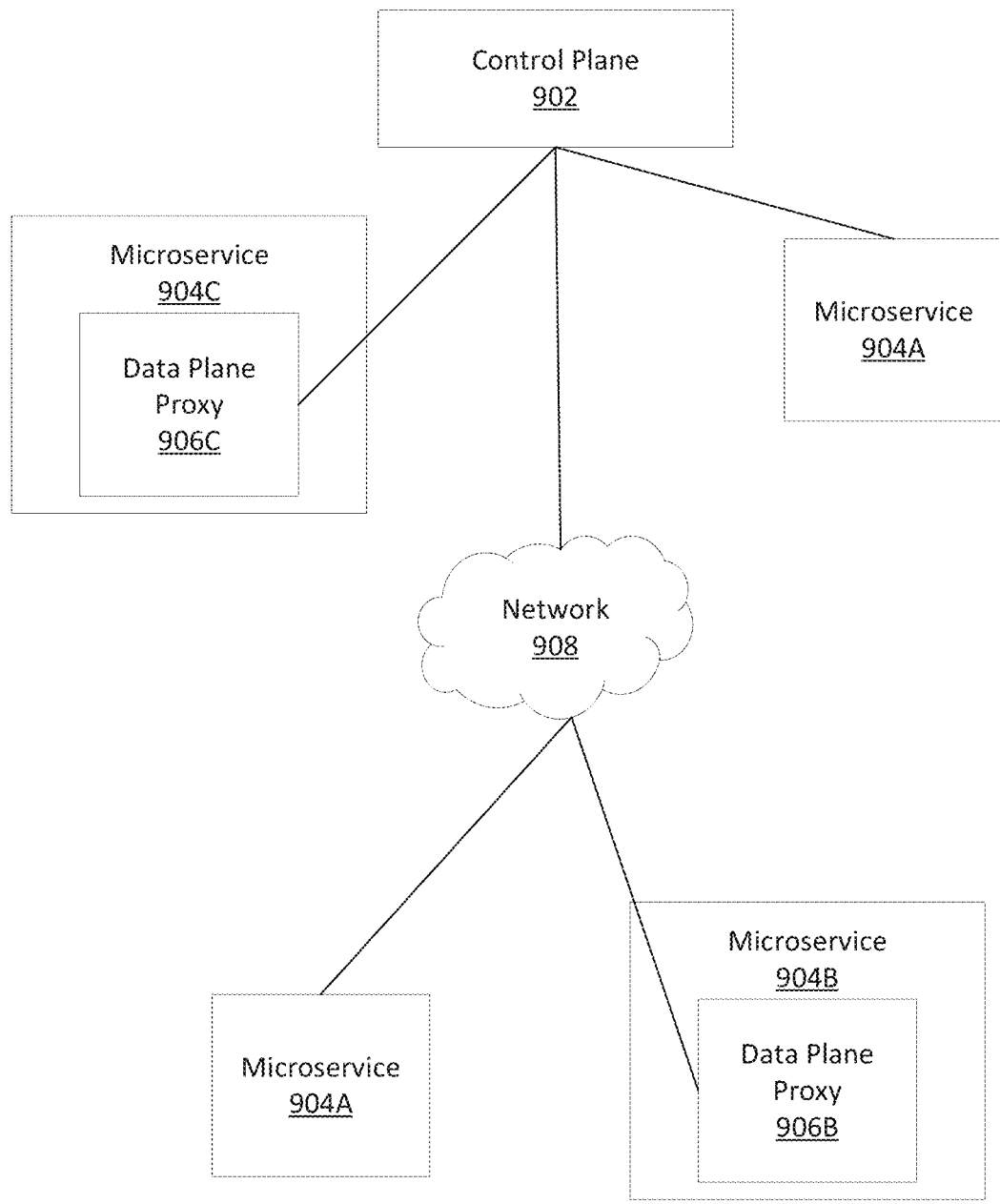
FIG. 9 is a block diagram illustrating an example environment of a control plane and a plurality of microservices.

FIG. 9 is a block diagram illustrating an example environment of a control plane 902 and a plurality of microservices 904. The control plane 902 is connected to a plurality of microservices 904 directly to or via a network 908. In some embodiments, additional or alternative components to those shown in FIG. 9 are connected (either directly or via the network 908) to the control plane 902. For example, in some embodiments, any number of microservices 904, rather than the four shown in FIG. 9, connect to the control plane 902.

The network 908 is any collection of distinct networks operating wholly or partially in conjunction to provide connectivity to/from the control plane 902 and one or more microservices 904. In one embodiment, network communications can be achieved by, an open network, such as the Internet, or a private network, such as an intranet and/or the extranet. Examples of the network 908 include a telephonic network, an open network, such as the Internet, or a private network, such as an intranet and/or the extranet. For example, the Internet provides file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

The control plane 902 links the plurality of microservices 904 for a microservice architecture application. The control plane 902 communicates with the microservices 904 to facilitate running the microservice architecture application. For example, the control plane 902 is enabled to send instructions for configuring settings of the microservices 904 and send data for the microservice architecture application to the microservices 904 for processing. The control plane 902 may also receive outputs from the microservices 904 for the processing, which allows the control plane 902 to maintain an overview of how the microservices 904 are operating for the microservice architecture application.

Each microservice 904 is an API (such as API 208 or API 312 or service instance 722) that performs actions for a microservice architecture application and is configurable based on communications received from the control plane 902. For instance, a microservice 904A receives instructions from and communicates input and output data with the control plane 902 directly, or a microservice 904B communicates with the control plane 902 via the network 908. In another example, a microservice 906C communicate with the control plane 902 via a data plane proxy 906C at the microservice 906C. The control plane 902 sends instructions to the microservice 904 indicating configuration settings that the microservice 904 is to operate with, but the control plane 902 cannot directly observe a microservice's 904 settings. Instead, the microservice 904 receives requests from the control plane 902 for the microservice's 904 current settings (e.g., the settings that service is configured with when it received the request) and send the current settings that microservice 904 is operating under to the control plane 902.

In some embodiments, a microservice 904 generates a set of data representing the current settings. An example includes application of a hashing algorithm (or another form of encryption) to the set of data to hash the representation of its current settings to reduce bandwidth, ensure security and/or privacy, and the like. The microservice 904 sends the hashed current settings to the control plane 902. In alternate embodiments, a microservice 904 sends the current settings to an associated data plane proxy 906. Either of the microservice 904 or the data plane proxy 906 applies the hashing algorithm to the current settings before sending the hashed current settings to the control plane 902.

The microservice architecture application is a computer program that performs one or more functions. The microservice architecture application is facilitated by the control plane 902 such that processes for running the microservice architecture application are distributed among the plurality of microservices 904 connected to the control plane 902. In some embodiments, the control plane 902 facilitates the processing of multiple microservice architecture applications by distributing the processes for the microservice architecture applications across the plurality of microservices 904. For instance, under some conditions the control plane 902 breaks down the processing required for each microservice architecture application into a set of processes and determine for each process how much computing power, memory, storage, and the like is needed for performing the process.

The control plane 902 requests data indicating the ability (e.g., graphics processing units available, storage available, etc.) of one or more microservices 904 for running the process from the microservices 904 and selects a microservice for each process based on this data. In addition, the control plane 902 monitors the ability of the microservices over time to redistribute processes among the microservices based on this data.

The control plane 902 monitors microservices 904 as the microservices 904 perform operations for a microservice architecture application. When instantiating the microservice architecture application, the control plane selects a plurality of microservices 904 to each perform a process for the microservice architecture application. The control plane 902 sends, to each microservice 904, instructions for configuring the settings of the microservice 904 to perform the process and send input data for the process. The control plane 902 stores a record of the instructions and the settings in a database. The database is located within the control plane 902 or is connected to the control plane 902 via the network 908. In some embodiments, the control plane 902 stores the record in relation to a time the instructions were sent. Further, the control plane 902 may store the data in relation to an identifier of the microservice 904 such that the control plane 902 can query the database with the identifier to retrieve instructions and settings associated with the microservice 904.

In some embodiments, the control plane 902 communicates (e.g., sends input data for processing, sends instructions for setting configuration, and/or receives output data) with the microservices 904 via one or more data plane proxies 906. A data plane proxy 906 functions as an intermediary between the control plane 902 and one or more microservices 904 to provide security and privacy and control the requests sent between the control plane 902 and the microservices 904. The data plane proxies 906 function like the gateway nodes 206, 308, 604 described in relation to FIGS. 2-6 or the proxies 708, 804 described in relation to FIGS. 7-8. In some embodiments, a data plane proxy 906 serves as a gateway for a single microservice 904 of the plurality of microservices 904 employed for the microservice architecture application.

In other embodiments, a data plane proxy 906 serves as a gateway for a subset or all of the plurality of microservices employed for the microservice architecture application. Further, in certain embodiments, the data plane proxies 906 each store subsets of the database at the request of the control plane 902. For instance, the control plane 902 requests that a data plane proxy 906B store a subset of the database related to associated microservice 904B. Though data plane proxies 906 act as gateways for communication between the control plane 902 and microservices 904 in a plurality of embodiments, for simplicity, the communications are often described herein as occurring directly between the control plane 902 and the microservices 904.

As the microservices are performing the processes, the control plane 902 queries one or more microservices 904 for their current settings. For example, the control plane 902 may periodically (e.g., at regular time intervals) request the current settings of each microservice 904. In another example, the control plane 902 requests the current settings in response to receiving a request from an external computing device (e.g., client 202) for the current settings of a microservice 904.

In some embodiments, as the control plane 902 receives outputs from the microservices 904 performing the processes, the control plane assesses the outputs to determine whether each microservice 904 is performing as expected based on the configurable settings of the microservice 904 stored by the control plane 902 in the database (henceforth referred to as the "deployed version" of the configurable settings of the microservice 904). Where the microservice 904 is not performing as expected, the control plane 902 requests the current settings of the microservice. For example, the control plane 902 may have instructed multiple microservices 904 to perform the same process. If control plane 902 is receiving outputs from one of the multiple microservices 904 that do not match the outputs of the other microservices 904, the control plane 902 determines that the microservice 904 is not performing as expected and request its current settings.

The control plane 902 receives current settings from a queried microservice 904. In some embodiments, the current settings are the configurable settings the microservice 904 had when it received the request (or query) from the control plane 902. In other embodiments, the microservice 904 applies a hashing algorithm (or another form of encryption) to the current settings before sending the hashed current settings to the control plane 902. In other embodiments, the microservice 904 sends its current settings to a data plane proxy 906, which applies the hashing algorithm before sending the hashed current settings to the control plane 902. Applying the hashing algorithm to the current settings may reduce the bandwidth necessary for transmitting the current settings to the control plane 902 and ensure more security and privacy of the current settings during transmission between the modules shown in FIG. 2.

The control plane 902 accesses a deployed version of the configurable settings of the microservice 904 at the database. The deployed version describes the configurable settings the control plane 902 had stored for the microservice 904 when the control plane 902 sent the request. In some embodiments, the control plane 902 previously applied the hashing algorithm to its stored understanding of the microservice's configurable settings to obtain the deployed version stored at the database. In other embodiments, the control plane 902 obtains the hashing algorithm from the microservice 904 along with the current settings (or in response to a separate request) and applies the hashing algorithm to the deployed version. The control plane 902 compares the current settings received from the microservice 904 to the deployed version to determine whether the current settings and deployed version match.

If the current settings and deployed version match, the control plane 902 stores an indication of the match in the database. In some embodiments, the control plane 902 stores the indication in association with the identifier of the microservice 904. In further embodiments, the control plane stores the indication in association with a time that the comparison was performed. If the current settings and the deployed version do not match, the control plane 902 updates the deployed version in the database to match the current settings. In some embodiments, the control plane 902 sends instructions to the microservice 904 to alter its settings based on the process the microservice 904 is performing for the microservice architecture application. In other embodiments, the control plane 902 moves the process at the microservice 904 to a different microservice 904 suitable for running the process. The different microservice 904 may have current settings matching the deployed version or the control plane 902 may instruct the different microservice 904 to configure itself with settings matching the deployed version.

In one example, the control plane 902 instructs a plurality of microservices 904 to perform the same process for a microservice architecture application. During execution a first microservice 904A of the microservice application was operating slowly due to connectivity issues thereby affecting receipt of input data. Thus, the first microservice 904A missed an update on configurable settings sent to a number of microservices 904 from the control plane 902. The other microservices 904 in a given settings deployment received the update and configured respective settings accordingly. The control plane stores settings related to the update as the deployed version of the current settings of each of the microservices 904 in a local database.

Sometime later, the control plane observes the (non-updated) first microservice 904A operating at different than expected rates as compared to peer microservices. In response to the unexpected performance statistics, the control plane 902 queries the first microservice 904A for the configuration settings being executed at the first microservice 904A.

The first microservice 904A receives the request from the control plane 902. In some instances, the first microservice 904A receives the request from an associated data plane proxy that functions as a gateway between the first microservice 904A and the control plane 902. The first microservice 904A hashes its current settings and sends the hashed current settings to the control plane 902. Upon receipt, the control plane 902 compares the hashed current settings of the first microservice with a hash of the deployed version of the current settings in the local database (using a matching hash function).

As a result that the first microservice 904A is operating with outdated configuration settings, the control plane 902 determines that the hashed current settings and hashed deployed version do not match one another. In response, the control plane 902 resends the update to the first microservice 904A to update its configurable settings to match the deployed version. The control plane iterates upon requesting and comparing the current settings of the first microservice 904A until the control plane 902 determines that the deployed version and current settings match.

Figure 10:
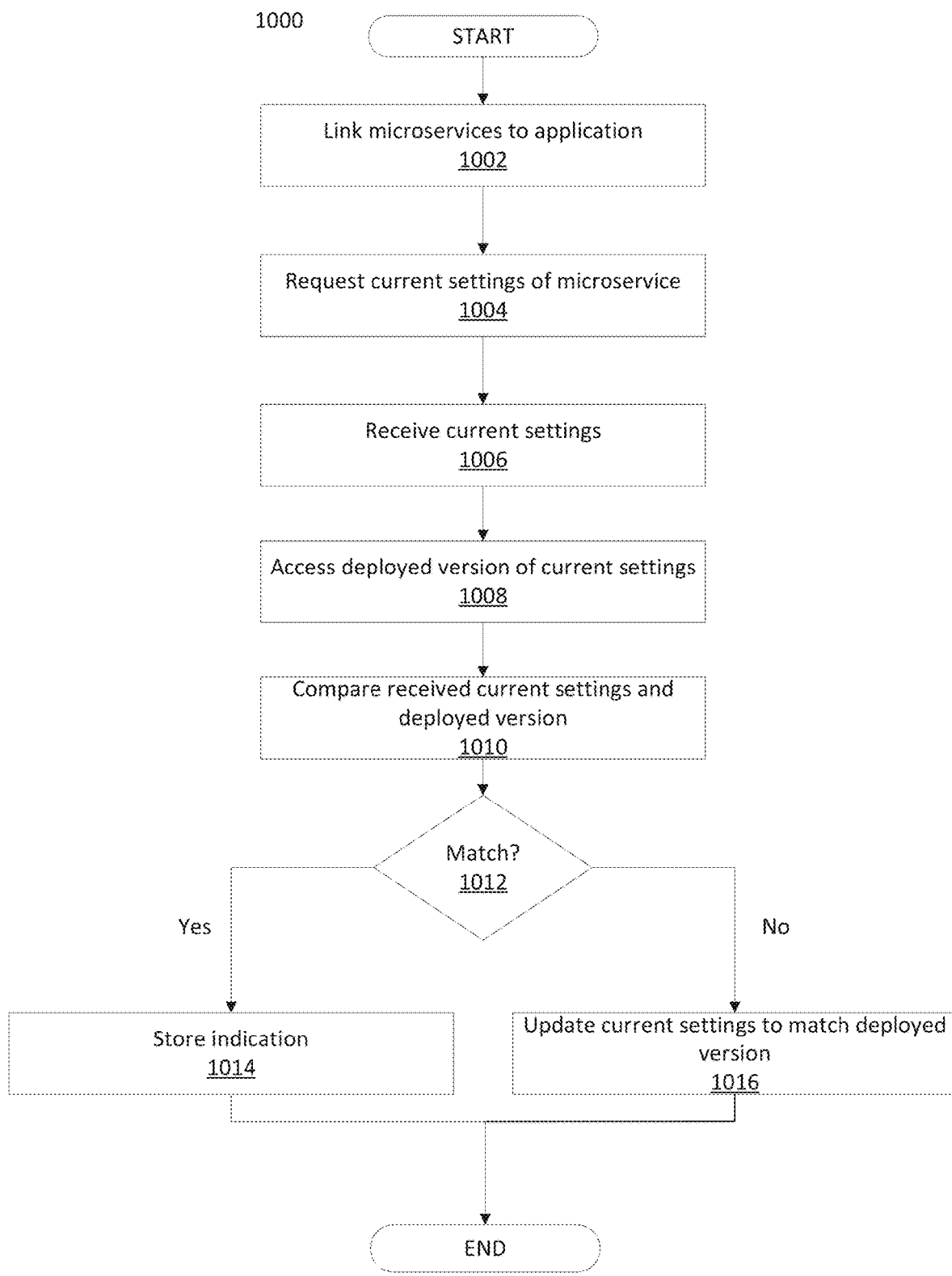
FIG. 10 is a flowchart illustrating a process for comparing received settings of a microservice to a deployed version of the configurable settings stored at the control plane.

FIG. 10 is a flowchart illustrating a process 1000 for comparing received settings of a microservice 904 to a deployed version of the configurable settings stored at the control plane 902. In step 1002, the control plane 902 links a plurality of microservices 904 to a microservice architecture application. Each of the plurality of microservices 904 is an API that performs one or more actions for the microservice architecture application based on instructions received from the control plane 902. Each microservice 904 has configurable settings that indicate how the microservice performs the actions for the microservice architecture application 904, and the control plane 904 configures the settings of a microservice 904 by sending instructions directly to the microservice 904 or to a data plane proxy 906 at the microservice 904. In some embodiments, the control plane 902 is configured to communicate information about the plurality of microservices 904 to an external computing device using the microservice architecture application.

At step 1004, the control plane 902 requests current settings of a first microservice 904 of the plurality of microservices 904. The current settings of the first microservice 904 are the settings that the first microservice 904 is configured with when the control plane 902 sends the request. In some embodiments, the control plane 902 sends the request for the current settings to the first microservice 904 directly. The control plane 902 sends to the request via the network 908 or to a data plane proxy 906A at the first microservice 904, and the data plane proxy 906 in turn requests the current settings from the first microservice 904. In other embodiments, the control plane 902 sends the request in response to receiving a first request from an external computing device for the current settings of the first microservice 904. The external computing device is communicatively coupled to the control plane 902 directly or via the network 908. In further embodiments, the control plane 902 requests the current settings of the first microservice 904 in response to determining that the first microservice 904 is outputting output data with values outside of an expected range and/or at a threshold frequency. The control plane 902 accesses the expected values and/or threshold frequency from the database. Alternatively, the control plane 902 compares the values and/or frequency to output data received from another microservice 904 with similar/the same current settings.

At step 1006, the control plane 902 receives the current settings of the first microservice 904. The control plane 902 receives the current settings of the first microservice 904 directly from the first microservice 904, via the network 908, or from a data plane proxy 906 associated with the first microservice 904. Before the control plane 902 receives the current settings, the current settings may have been hashed with a hashing algorithm, either at the first microservice 904 or at the data plane proxy 906.

In step 1008, the control plane 902 accesses a deployed version of the configurable settings. The deployed version represents the control plane's 902 understanding of what the configurable settings of the first microservice 904 are at a current time. For example, in some embodiments, the deployed version is the settings described by the last set of instructions the control plane 902 sent to the first microservice 904. In other embodiments, the deployed version is a copy of the settings received from the first microservice 904 the last time the control plane 902 requested the first microservice's 904 settings. In further embodiments, the deployed version has been hashed by the control plane 902 using the hashing algorithm.

At step 1010, the control plane 902 compares the current settings to the deployed version. The control plane 902 determines a percentage match between the current settings and deployed version, such as by doing a string, numeric, key, or key-value pair comparison between corresponding elements in each of the current settings and the deployed version. In some embodiments, the control plane 902 compares a hash of the current settings to a hash of the deployed version. In these embodiments, the control plane compares values or arrays of values sequentially in each hash to determine whether the hashes match.

At step 1012, the control plane 902 determines whether the current settings and deployed version match. If the percentage match is greater than a threshold value (e.g., 99%), the control plane 902 determines that the current settings matches the deployed version. Otherwise, the control plane 902 determines that the current settings and deployed version do not match. In some embodiments, the control plane 902 only determines that the current settings and deployed version match if the percentage is 100%. In other embodiments, the control plane 902 uses a threshold value received from an external computing device to use in the comparison.

At step 1014, responsive to determining that the current settings and deployed version match, the control plane 902 stores an indication of the match. The indication may include the percentage match, a time the request was sent by the control plane 902, a time the current settings were received by the control plane 902, an identifier of the first microservice 904, a time the comparison was performed, and the like. The control plane 902 stores the indication in an internal database or at a database connected to the control plane 902 via the network 908. In some embodiments, the control plane 902 stores the indication at a data plane proxy 906 associated with the first microservice 904. The database may be tabulated based on identifiers of each microservice 904 in the plurality of microservices 904 connected to the control plane, such that the control plane 902 can query the database with the identifier of a microservice 904 to access related indications. Additionally or alternatively, the database may be tabulated by time (that the current settings were received, that the comparison was performed, that the indication was created, etc.).

At step 1016, responsive to determining that the current settings and deployed version do not match, the control system 902 updates the current settings of the first microservice 904 to match the deployed version. For instance, the control system 902 sends instructions to the first microservice 904 to configure itself with settings matching the deployed version. In other embodiments, the control system 902 sends changes for the first microservice 904 to configure its settings with. In alternate embodiments, the control system 902 updates the deployed version in the database to match the current settings and/or move the process running at the first microservice 904 to another microservice 904. In further embodiments, the control system 902 queries a data plane proxy 906 at the first microservice 904 for a record of the settings of the first microservice 904 over time to determine when and how the configurable settings were changed to not match the deployed version stored at the control plane 902. In some embodiments, each of the plurality of microservices 904 other than the first microservice are configured with the deployed version of the configurable settings and the control plane 902 updates the current settings of the first microservice 902 to also match the deployed settings in response to the comparison not yielding a match.

In some embodiments, alterative or additional steps or modules are used in the process shown in FIG. 10. For example, in some embodiments, each of the plurality of microservices 904 includes its own data plane proxy 906 configured to communicate with the control plane 902. In these embodiments, the control plane 902 receives the current settings from the data plane proxy 906 of the first microservice 904 and instructs the data plane proxy 906 to update the current settings of the first microservice 904 to match the deployed version in response to the current settings not matching the deployed version. Further, the data plane proxy 906 may run simultaneously with the first microservice 904 and communicate outputs from the first microservice 904 to the control plane 902.

In some embodiments, the control plane 902 hashes the current settings and the deployed version prior to the comparison. In other embodiments, the control plane 902 hashes the deployed version of the configurable settings stored for the first microservice 904 with a hashing algorithm and compares the hashed deployed version to the current settings, which were also hashed with the hashing algorithm.

Exemplary Computer System

Figure 11:
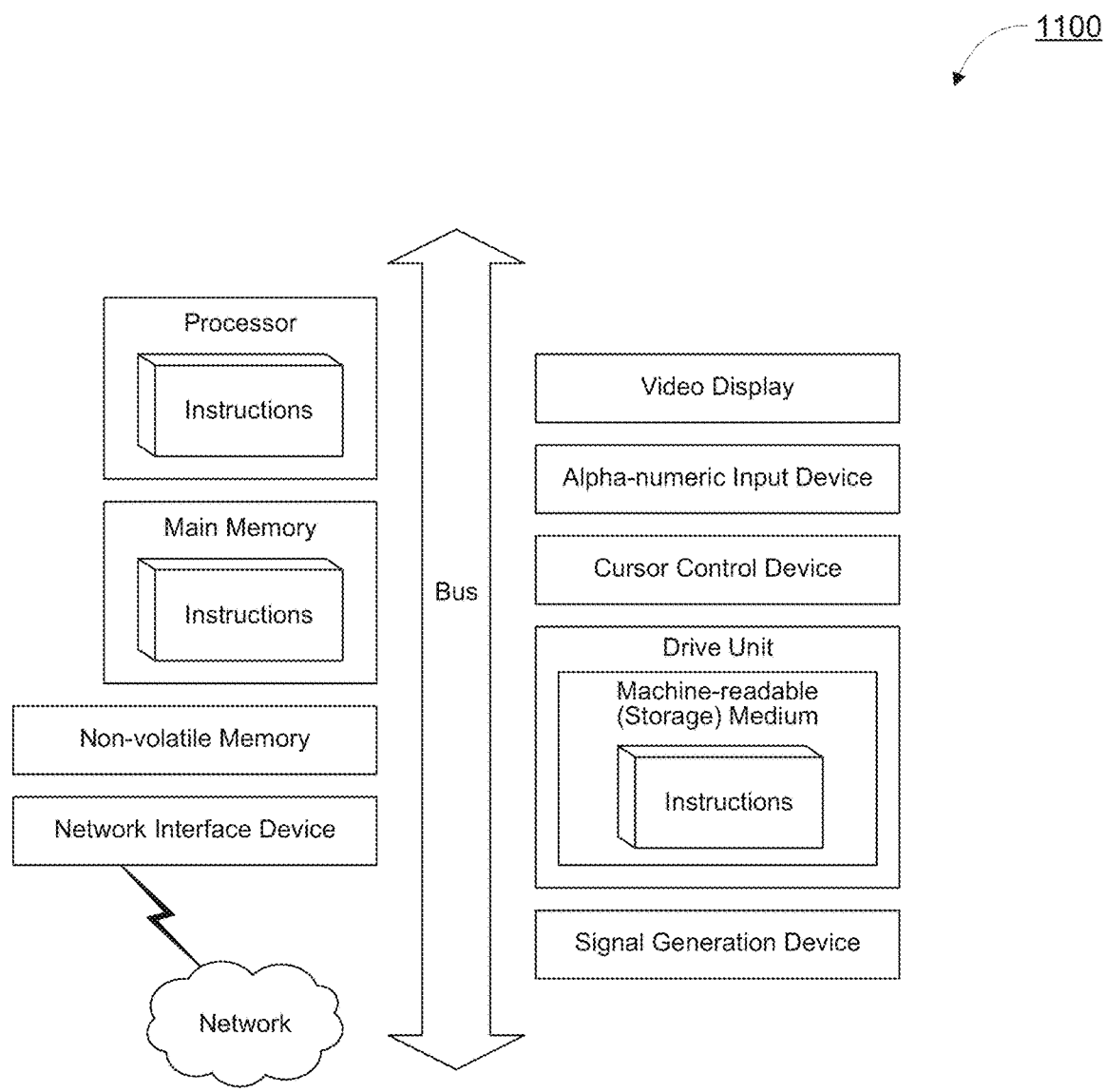
FIG. 11 depicts a diagrammatic representation of a machine in the example form of a computer system within a set of instructions, causing the machine to perform any one or more of the methodologies discussed herein, to be executed.

FIG. 11 shows a diagrammatic representation of a machine in the example form of a computer system 1100, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

All patents, applications and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

The invention claimed is:

1. A method comprising:
   linking, by a control plane, a plurality of microservices to a microservice architecture application, wherein each of the plurality of microservices is an application programming interface that performs one or more actions for the microservice architecture application, each microservice associated with configurable settings;
   requesting, by the control plane, current settings from a first microservice;
   receiving, from the first microservice, the current settings;
   accessing, by the control plane, a deployed version of the configurable settings associated with the first microservice as stored with the control plane;
   comparing the current settings as received from the first microservice to the deployed version of the configurable settings of the first microservice; and
   responsive to the received current settings not matching the deployed version, updating the current settings of the first microservice to match the deployed version.

2. The method of claim 1, wherein each of the plurality of microservices includes a data plane proxy configured to communicate to the control plane.

3. The method of claim 2, further comprising:
   receiving the current settings from the data plane proxy of the first microservice; and
   responsive to the received current settings not matching the deployed version, instructing the data plane proxy to update the current settings of the first microservice to match the deployed version.

4. The method of claim 2, wherein the data plane proxy of the first microservice runs simultaneously with the first microservice and communicates outputs from the first microservice to the control plane.

5. The method of claim 1, further comprising:
   hashing the current settings and the deployed version of the configurable settings prior to said comparing.

6. The method of claim 1, wherein the control plane is configured to communicate information about the plurality of microservices to a computing device running the microservice architecture application.

7. The method of claim 1, further comprising:
   responsive to the received current settings matching the deployed version, storing, in a database, an indication of a time the comparison was performed.

8. The method of claim 1, further comprising:
   hashing the deployed version of the configurable settings using a hashing algorithm, wherein the received current settings were hashed using the hashing algorithm; and comparing the hashed deployed version to the received current settings.

9. The method of claim 1, further comprising:
responsive to the received current settings not matching the deployed version, sending, to the first microservice, one or more changes for the current settings.

10. The method of claim 1, further comprising:
receiving, from a computing device communicatively connected to the control plane, a request for the current settings of the first microservice.

11. The method of claim 10 wherein the computing device is connected to the control plane via a network.

12. The method of claim 1, wherein each of the plurality of microservices other than the first microservice are configured with the deployed version of the configurable settings.

13. The method of claim 1, wherein requesting the current settings from the first microservice is responsive to determining, by the control plane, the first microservice is outputting values outside of an expected range at a threshold frequency.

14. A method comprising:
linking a plurality of microservices to a microservice architecture application, wherein each of the plurality of microservices is an application programming interface that performs one or more actions for the microservice architecture application, each microservice associated with configurable settings;
requesting, from a data plane proxy connected to a first microservice, current settings of the first microservice;
receiving, from the data plane proxy, the current settings;
accessing a deployed version of the configurable settings for the first microservice from a database;
comparing the received current settings of the first microservice to the deployed version of the configurable settings; and
responsive to the received current settings not matching the deployed version, updating the current settings of the first microservice to match the deployed version.

15. The method of claim 14, wherein the data plane proxy runs simultaneously with the first microservice and communicates outputs from the first microservice to a control plane.

16. The method of claim 14, wherein the received current settings were hashed prior to being sent to a control plane by the data plane proxy and wherein the deployed version of the configurable settings comprises a hashed estimate of the current settings stored by the control plane.

17. The method of claim 16, wherein the control plane is configured to communicate information about the plurality of microservices to a computing device running the microservice architecture application.

18. The method of claim 14, further comprising:
responsive to the received current settings matching the deployed version, storing, in the database, an indication of a time of the comparison was performed.

19. The method of claim 14, further comprising: hashing the deployed version of the current settings using a hashing algorithm, wherein the received current settings were hashed using the hashing algorithm; and comparing the hashed deployed version to the received current settings.

20. A system comprising:
a computer processor; and
a non-transitory computer-readable storage medium storing instructions that when executed cause the computer processor to perform actions comprising:
linking a plurality of microservices to a microservice architecture application, wherein each of the plurality of microservices is an application programming interface that performs one or more actions for the microservice architecture application, each microservice associated with configurable settings;
requesting, from a proxy connected to a first microservice, current settings of the first microservice;
receiving, from the proxy, the current settings;
accessing a deployed version of the configurable settings for the first microservice from a database;
comparing the received current settings of the first microservice to the deployed version of the configurable settings; and
responsive to the received current settings not matching the deployed version, updating the current settings of the first microservice to match the deployed version to the proxy.

* * * * *